US011791981B2

(12) United States Patent
Johnston et al.

(10) Patent No.: US 11,791,981 B2
(45) Date of Patent: *Oct. 17, 2023

(54) GENERATING CRYPTOGRAPHIC RANDOM DATA FROM RAW RANDOM DATA

(71) Applicant: Juniper Networks Inc., Sunnyvale, CA (US)

(72) Inventors: Anna M. Johnston, Vancouver, WA (US); Purushottam Anant Kulkarni, Mountain View, CA (US)

(73) Assignee: Juniper Networks, inc., Sunnyvale, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 17/304,976

(22) Filed: Jun. 29, 2021

(65) Prior Publication Data

US 2021/0328771 A1      Oct. 21, 2021

Related U.S. Application Data

(63) Continuation of application No. 16/415,578, filed on May 17, 2019, now Pat. No. 11,057,186.

(51) Int. Cl.
*H04L 9/06* (2006.01)
*H04L 9/08* (2006.01)

(52) U.S. Cl.
CPC .......... *H04L 9/0637* (2013.01); *H04L 9/0869* (2013.01); *H04L 9/0894* (2013.01)

(58) Field of Classification Search
CPC .... H04L 9/0637; H04L 9/0869; H04L 9/0894
See application file for complete search history.

(56) References Cited

U.S. PATENT DOCUMENTS

| | | | |
|---|---|---|---|
| 11,057,186 B1 * | 7/2021 | Johnston | H04L 9/0637 |
| 2010/0316217 A1 | 12/2010 | Gammel et al. | |
| 2014/0244785 A1 * | 8/2014 | Potlapally | H04L 9/0662 709/217 |
| 2016/0112197 A1 | 4/2016 | Johnston | |
| 2019/0020470 A1 | 1/2019 | Shamee et al. | |
| 2019/0199517 A1 | 6/2019 | Satpathy et al. | |

OTHER PUBLICATIONS

Cachin, C., "Entropy Measures and Unconditional Security in Cryptography," Diss. ETH No. 12187, 1997, 155 pages.
Johnston, A., "Reed-Solomon, the Chinese Remainder Theorem, and Cryptography," Sep. 14, 2016, 125 Pages.
Mioc, M.A., et al., "Some Aspects of Using Shift Registers Based on 8 Degree Irreducible Polynomials," Proceedings of the 2014 International Conference on Mathematical Methods, Mathematical Models and Simulation in Science and Engineering, 2014, pp. 165-172.

* cited by examiner

*Primary Examiner* — Oleg Korsak
(74) *Attorney, Agent, or Firm* — Harrity & Harrity, LLP

(57) ABSTRACT

A device may store raw random data in a raw random data store. The raw random data may include a first plurality of data strings. The device may generate, using a quotient ring transform (QRT), cryptographic random data based on the raw random data. The cryptographic random data includes a second plurality of data strings that is transformed from the first plurality of data strings based on an extraction state stored in an extraction state store. The device may store the cryptographic random data in a cryptographic random data store and may use the cryptographic random data for various purposes.

20 Claims, 11 Drawing Sheets

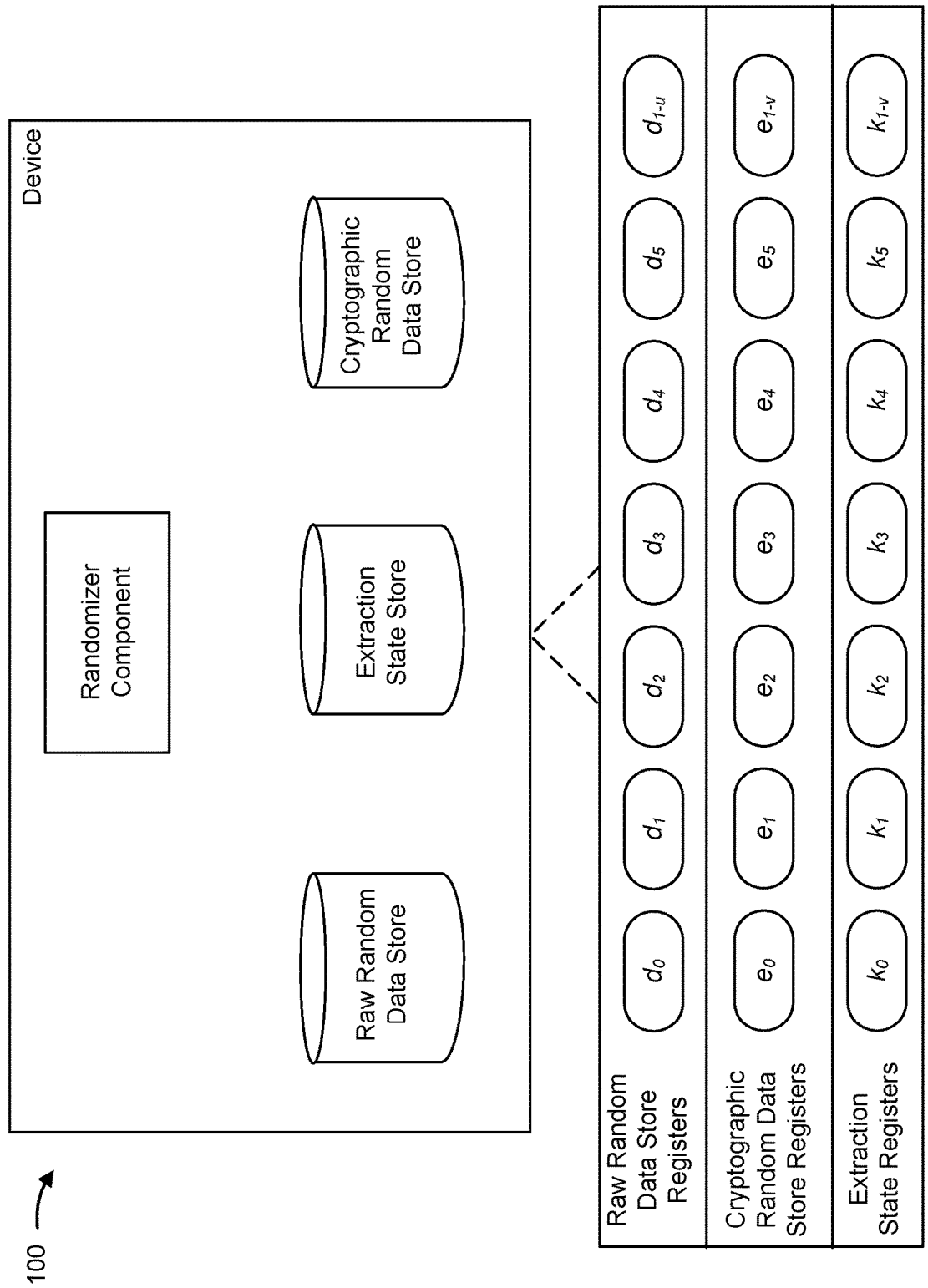

GENERATING CRYPTOGRAPHIC RANDOM DATA FROM RAW RANDOM DATA

RELATED APPLICATION

This application is a continuation of U.S. patent application Ser. No. 16/415,578, filed May 17, 2019 (now U.S. Pat. No. 11,057,186), which is incorporated herein by reference in its entirety.

BACKGROUND

A random number generator (RNG) includes one or more devices that are capable of generating random data. A pseudorandom or deterministic RNG may use various deterministic algorithms to generate random data, such as block ciphers, hashing functions, and/or the like.

SUMMARY

According to some implementations, a method may include storing raw random data in a raw random data store, wherein the raw random data includes a first plurality of data strings; generating, using a quotient ring transform (QRT), cryptographic random data based on the raw random data, wherein the cryptographic random data includes a second plurality of data strings, and wherein the second plurality of data strings is transformed from the first plurality of data strings based on an extraction state stored in an extraction state store; storing the cryptographic random data in a cryptographic random data store; and performing one or more cryptographic and/or network security processes based on the cryptographic random data.

According to some implementations, a device may include one or more memories and one or more processors to store raw random data in a first data store, wherein the raw random data includes a first plurality of data strings; determine whether a Shannon level of the first data store satisfies a Shannon level threshold; generate, based on determining that the Shannon level of the first data store satisfies the Shannon level threshold, cryptographic random data from the raw random data using a QRT, wherein the cryptographic random data includes a second plurality of data strings, and wherein the second plurality of data strings is transformed from the first plurality of data strings based on an extraction state stored in a second data store; store the cryptographic random data in a third data store; and performing one or more cryptographic and/or network security processes based on the cryptographic random data.

According to some implementations, a non-transitory computer-readable medium may store one or more instructions. The one or more instructions, when executed by one or more processors of a device, may cause the one or more processors to store raw random data in a raw random data store, wherein the raw random data includes a first plurality of data strings, wherein the first plurality of data strings are included in a plurality of registers, and wherein the plurality of registers comprise a Galois register; generate, based on the raw random data, cryptographic random data using a QRT, wherein the cryptographic random data includes a second plurality of data strings, and wherein the second plurality of data strings is transformed from the first plurality of data strings based on an extraction state stored in an extraction state store; store the cryptographic random data in a cryptographic random data store; shift, based on storing the cryptographic random data, the plurality of registers to step the Galois register; and performing one or more cryptographic and/or network security processes based on the cryptographic random data.

BRIEF DESCRIPTION OF THE DRAWINGS

FIGS. 1A-1E are diagrams of one or more example implementations described herein.

DETAILED DESCRIPTION

Figure 1B:
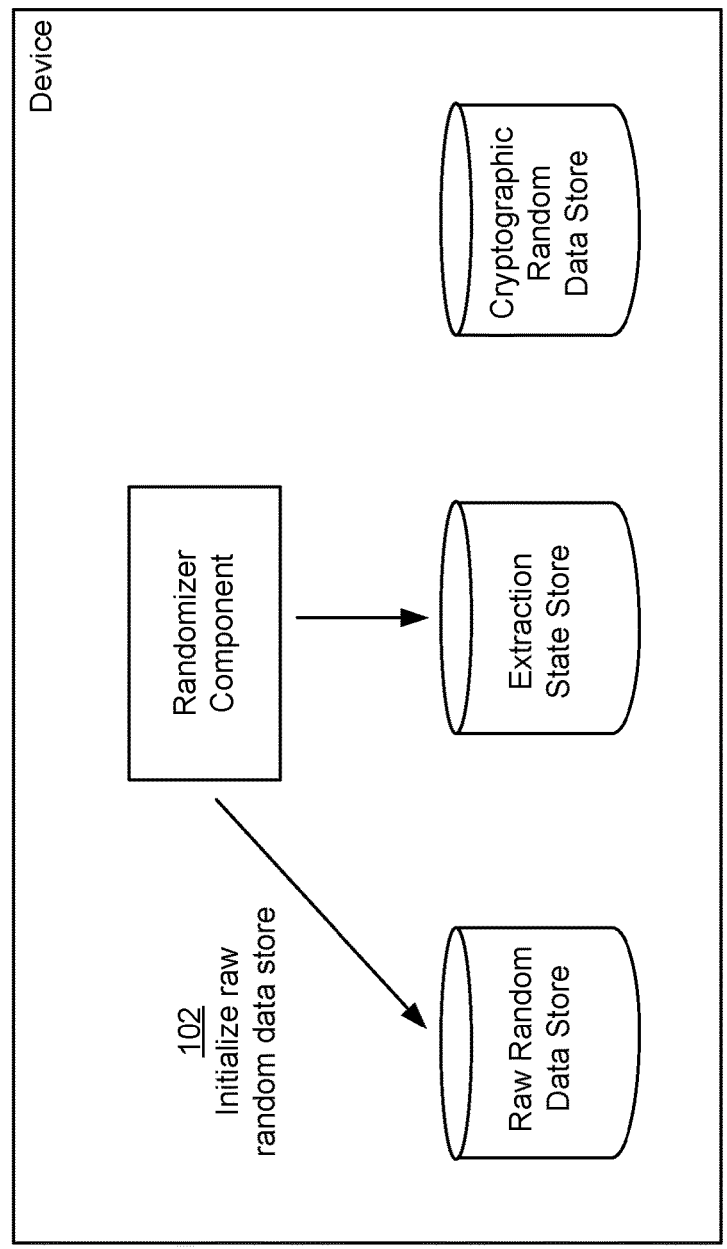

The following detailed description of example implementations refers to the accompanying drawings. The same reference numbers in different drawings may identify the same or similar elements.

Random data is an instrumental aspect of cryptographic and network security systems. A compromised random number generator (RNG) may compromise the computer and/or network security of a device if the device uses random data generated by the compromised RNG. While true random number generators (TRNGs or hardware RNGs (HRNGs)) are capable of generating raw (or true) random data via a physical process (e.g., as opposed to using an algorithm), deterministic random number generators (DRNGs) generate cryptographic random (or pseudo-random) data using an initial set of raw random data in block cipher or hashing function (e.g., an advanced encryption standard (AES) block cipher, an MD5 hashing function, and/or the like). As a result, DRNGs, such as those based on block chippers and hashing functions, are subject to various drawbacks, such as correlation of successive cryptographic random data (e.g., the potential for successive iterations of cryptographic random data to include repetitive values), the loss of entropy of the raw random data that is used by these block ciphers and hashing functions, and/or the like. These drawbacks may be used for various types of attacks, which can compromise a DRNG and/or devices that use cryptographic random data generated by the DRNG.

Some implementations described herein provide a device that is capable of using various techniques, described herein, to generate cryptographic random data in a manner that maintains an adequate flow of entropy. To manage the flow of entropy, the device may use an entropy ratio between entropy of raw random data and entropy of cryptographic random data generated from the raw random data. Moreover, the device may use various techniques, described herein, to accumulate, mix, concentrate, and extend raw random data.

In some implementations, the device may include a raw random data store in which raw random data is stored. The raw random data store may include a Galois stepping mechanism (e.g., a Galois register) to ensure that the raw random data is evenly mixed and concentrated with no entropy lost in the process. Moreover, the device may include an extraction state store that stores an extraction state associated with the raw random data store. The extraction state may indicate how cryptographic random data is generated from the raw random data in the raw random data store. The device may use a quotient ring transform (QRT) to extract the raw random data from the raw random data store and generate the cryptographic random data based on the extraction state. The device may store the cryptographic random data in a cryptographic random data store.

The Galois stepping of the raw random data and using the QRT to generate the cryptographic random data ensures that nothing about the current state of the raw random data (and thus, the state of the Galois register) and/or the extraction is revealed. Moreover, the device may step through all possible non-zero states of the Galois register, which may include, for example, $2^{280}-1$ states. Accordingly, the likelihood of correlation of successive generations of cryptographic random data is greatly reduced relative to hashing functions.

In this way, the use of Galois stepping of the raw random data (e.g., to mix, concentrate, and extend the raw random data) and using the QRT to generate the cryptographic random data increases the capability of the device to generate random data in a manner that is secure. Thus, the security of the processes and applications of the device, which use the random data generated by the device, is also enhanced. In this way, the device may more securely perform one or more cryptographic and/or network security processes based on the random data, such as generating cryptographic keys, encrypting plaintext data, decrypting cyphertext data, and/or the like.

FIGS. 1A-1E are diagrams of one or more example implementations 100 described herein. As shown in FIGS. 1A-1E, example implementation(s) 100 may include a device, such as a client device, a user device, a server device, a network device, and/or the like. The device may be capable of generating, transmitting, receiving, and/or forwarding traffic to one or more other devices.

As shown in FIG. 1A, the device may include various components, such as a randomizer component, a raw random data store, a cryptographic random data store, and an extraction state store. While FIG. 1A shows the device including a randomizer component, a raw random data store, a cryptographic random data store, in some implementations, the device may include different quantities of these components.

The randomizer component may include one or more devices capable of providing one or more types of DRNGs. For example, the randomizer component may provide a block cipher-based DRNG (e.g., an AES-based DRNG), a hash function-based DRNG (e.g., an MD5-based DRNG, a secure hash algorithm (SHA) based DRNG, and/or the like), and/or a Da Yan-based DRNG. The Da Yan-based DRNG may be a DRNG that uses a combination of a Galois register and a QRT to concentrate and extend raw random data. The QRT may include a transform that permits a computation on a large polynomial to be replaced by several computations on smaller polynomials based on the Da Yan (which may also be referred to as the Chinese remainder theorem). In this way, the randomizer component may use the QRT to parallelize the transformation of large strings of raw random data into cryptographic random data, which reduces the processing time of generating cryptographic random data.

The raw random data store may include one or more devices capable of storing raw random data. As indicated above, raw (or true) random data may include data that is generated by a TRNG or HRNG via a physical process. For example, a TRNG or HRNG may generate raw random data by converting statistically random physical sources, such as thermal noise, vibration, and/or the like, to an electrical signal.

The randomizer component may monitor the amount of entropy of the raw random data stored in the raw random data store. Entropy, as used herein, may refer to a measure of a rate of unpredictability of information represented by data. That is, the more new information (or the less predictable that the information is) that is represented per bit of data, the greater the amount of entropy there is in the data. Conversely, the less new information (or the more predictable that the information is) that is represented per bit of data, the lesser the amount of entropy there is in the data.

The randomizer component may monitor the amount of entropy of the raw random data stored in the raw random data store based on a Shannon level of the raw random data. A Shannon may refer to a unit of measure of entropy in data. If one bit of data is completely random (e.g., the probability of the bit being a 1-value or a 0-value is 50%), the bit of data may be said to have one Shannon. In some implementations, the randomizer component may monitor the Shannon level, s, of the raw random data as an entropy rate (e.g., Shannons-per-bit) and/or a total amount of entropy in Shannons. The randomizer component may store information identifying the current Shannon level of the raw random data store.

The randomizer component may update the Shannon level of the raw random data store based on a quantity of times that cryptographic random data is generated from the raw random data stored in the raw random data store. For example, the randomizer component may track the quantity of times that cryptographic random data is generated from the raw random data stored in the raw random data store since the last (or most recent) update of the Shannon level. If the quantity of times that cryptographic random data is generated from the raw random data, stored in the raw random data store, since the last update of the Shannon level, w, satisfies a threshold quantity, $w_m$, the randomizer component may update the Shannon level to ensure that the Shannon level accurately reflects the actual entropy in the raw random data store.

In some implementations, the threshold quantity, $w_m$, may be determined based on an entropy ratio, $S_r$, between the entropy of the raw random data entering the raw random data store the and entropy of cryptographic random data generated from the raw random data (and thus leaving the raw random data store). For example, the threshold quantity, $w_m$, may be determined by $$w_m = \left\lceil \frac{S_r}{vn} \right\rceil,$$

where v represents the quantity of data strings (e.g., words) of cryptographic random data generated from the raw random data and n is the smallest data unit in finite extension field $\mathbb{F}^n$. Examples of entropy ratios may be $2^{10}$, $2^{16}$, $2^{20}$, and/or the like.

To ensure that a threshold quantity of entropy is stored in the raw random data store, the randomizer component may maintain the Shannon level of the raw random data store such that the Shannon level satisfies a Shannon level threshold $s_m$. If the Shannon level of the raw random data store does not satisfy the Shannon level threshold, the randomizer component may prevent cryptographic random data from being extracted from the raw random data until new raw random data (and thus, additional entropy) is added to the raw random data store.

As shown in FIG. 1A, the raw random data store may include a plurality of registers in which raw random data is stored. Each register may store a data string of raw random electronic data bits. For example, each data string may correspond to a word of rn-bits length, where r may be configurable value and n is the smallest data unit in finite extension field $\mathbb{F}_{2^n}$. The raw random data store may store u data strings (e.g., words) in respective registers of the plurality of registers. The raw random data included in the jth word may be represented as $d_j$.

In some implementations, for purposes of concentrating and extending entropy of the raw random data in the raw random data store, each $d_j$ may represent an element of an extension field $\mathbb{F}_{2^{rn}}$, with the extension field being represented by $\mathbb{F}_{2^{rn}} \sim \mathbb{F}_2[x]/B$, where B is a constant irreducible polynomial of $\mathbb{F}_2$ of degree rn. As an element of $\mathbb{F}_{2^{rn}}$, $d_j$ is a coefficient of a polynomial modulo F, which may be a fixed primitive polynomial over $\mathbb{F}_{2^{rn}}$. To concentrate and extend the entropy of the raw random data, the plurality of registers may form a Galois register circuit that may be stepped or updated by multiplying by x (which may shift the u data strings (e.g., words) in the Galois register) and reducing modulo F. If F is represented as $$F = x^u + \Sigma_{j=0}^{u-1} c_j x^j \bmod B$$

the raw random data included in the updated ith register may be represented as $d'_i$, which may be represented as $$d'_i = \begin{cases} c_0 \cdot d_{u-1} \bmod B, & i = 0 \\ d_i + c_i \cdot d_{u-1} \bmod B, & 0 < i < u \end{cases}$$

Since primitive polynomials have the property that a root has maximal order $2^{urn} - 1$, the randomizer component may step the Galois register, for non-zero initial states, through every non-zero possible state to mix, concentrate, and extend the raw random data. As an example, if u is selected as 7, r is selected as 5, and n is selected as 8 bits, the Galois register may have $2^{280} - 1$ non-zero states, which means that the randomizer component may step through $2^{280} - 1$ shifts of the Galois register before the Galois register starts to repeat values.

In some implementations, for purposes of extracting raw random data from the raw random data store and transforming the raw random to cryptographic raw random data, each $d_j$ may represent a modulo a degree r polynomial over $\mathbb{F}_{2^n}$, which may be represented as $q_j$. The u polynomials, $\{q_j\}_{j=0}^{u-1}$, may be distinct and irreducible. The collection of u data/moduli pairs may represent a large polynomial D. If Q is the product of the moduli, $$Q = \prod_{j=0}^{u-1} q_j,$$

then D(x)mod Q may be the large polynomial such that $$D(x) \equiv d_j \bmod q_j$$

for $0 \leq j < u$. The large polynomial may be unique modulo Q due to the Da Yan.

As a result of the above properties, the randomizer component, when transforming raw random data into cryptographic raw random data, may transform individual data strings (e.g., words) of the raw random data such that the transformation of the u data strings (e.g., words) may be parallelized.

The cryptographic random data store may include a plurality of registers in which cryptographic random data is stored. Each register may store a data string of cryptographic random data. For example, each data string may correspond to a word of n-bits length. The cryptographic random data store may store v data strings (e.g., words) in respective registers of the plurality of registers. The raw random data included in the jth data string (e.g., word) may be represented as $e_j$. Cryptographic random data, stored in the cryptographic random data store, may represent the large polynomial of the raw random data, described above, reduced modulo $p_j$.

$$D(x) \equiv e_j \bmod p_j \; e_j \equiv D(k_j) \bmod b$$

The extraction state store may store the extraction state, associated with the raw random data store, in a plurality of registers. The extraction state may include v data strings (e.g., words) of n-bit length and of value k. The value included in the jth word may be represented as $k_j$, which may define a polynomial $p_j = (x - k_j) \bmod b$, where b is an irreducible polynomial of degree n over $\mathbb{F}_2$ and $p_j = (x - k_j)$ is a degree one irreducible polynomial over $\mathbb{F}_2$ (with $k_j \neq k_i$ for all $i \neq j$) that varies in time. The polynomials associated with the extraction state determine how raw random data is transformed or converted to cryptographic random data in the cryptographic random data store.

As shown in FIG. 1B, and by reference number 102, in order to begin generating cryptographic random data, the randomizer component may initialize the raw random data store such that raw random data may be stored. The randomizer component may initialize the raw random data store to ensure that the raw random data store and the extraction state, associated with the raw random data store, are in a non-zero state.

To do so, the randomizer component may set each register of the plurality of registers of the raw random data store to all 1-values. For example, the randomizer component may set $d_j$=0xffffffff for $0 \leq j < u$. The randomizer component may set each value $k_j$ extraction state, associated with the raw random data store, such that $k_j=1$ for $0 \leq j < v$. The randomizer component may set the Shannon level of the raw random data store, s, such that s=0. The randomizer component may set the quantity of times that cryptographic random data is generated from the raw random data stored in the raw random data store since the last update of the Shannon level, w, such that w=0.

Figure 1C:
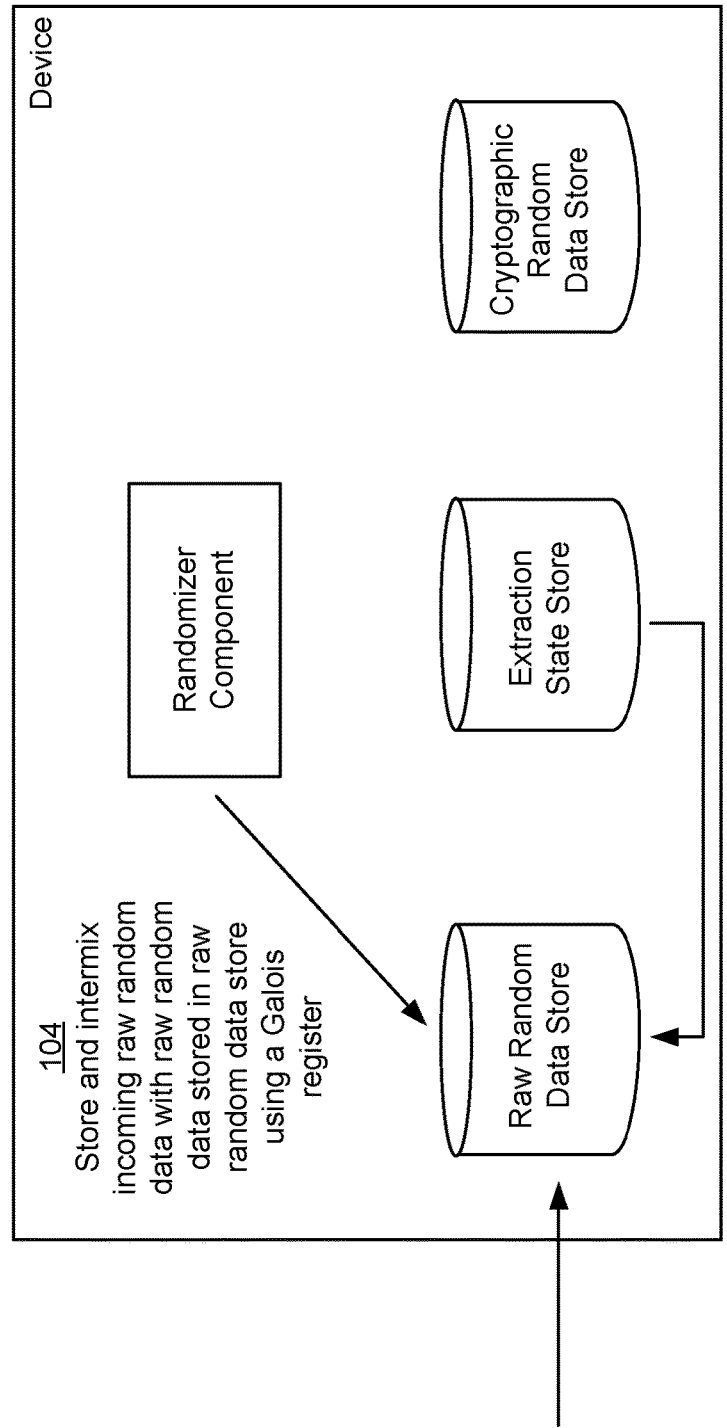

As shown in FIG. 1C, and by reference number 104, once the raw random data store has been initialized, the randomizer component may store, intermix, and concentrate incoming raw random data (e.g., raw random data being added to the raw random data store) with raw random data stored in the raw random data store using the Galois register. In some implementations, the randomizer component may add raw random data to the raw random data store based on initializing the raw random data store. In this case, the randomizer component may add raw random data to the raw random data store for the first time since the raw random data store was initialized. In some implementations, the randomizer component may add raw random data to the raw random data store based on determining that the Shannon level of the raw random data store does not satisfy the Shannon level threshold.

In some implementations, the randomizer component may add t data strings (e.g., words) of incoming raw random data, each of rn bits, to the raw random data store. The randomizer component may intermix and concentrate the t data strings (e.g., words) with data strings (e.g., words) a stored in raw random data store based on $d_{u-1-j} = d_{u-1-j} \oplus a_j$ for j=0 to t-1.

The randomizer component may update the Shannon level, of the raw random data store, based on adding the raw random data to the raw random data store by setting ns=[trnp] and determining the Shannon level based on $$s = \begin{cases} urn, & s+ns > urn \\ s+ns, & \text{otherwise} \end{cases}$$

Once the raw random data has been intermixed and concentrated, and stored in the raw random data store, the randomizer component may determine whether the intermixing and concentrating resulted in a zero state for the raw random data store (e.g., a state in which the raw random data, stored in the raw random data store, is all 0 values). If the randomizer component determines that the raw random data store is in a non-zero state, the randomizer component may shift the plurality of registers to step the Galois register to mix, concentrate, and extend the raw random data.

To step the Galois register, the randomizer component may determine a stepping value, h, such that $u \leq h < 2u$, and may shift the plurality of registers in h single steps. To determine the stepping value, the randomizer component may set $h=d_{u-1}$, may set $h=h \oplus k_j$ for j=0 to v−1 such that all extraction state values k are added to determine the stepping value, and may set $h=u+(h \mod u)$ such that the stepping value is between $u \leq h < 2u$. The randomizer component may shift the plurality of registers h steps, for j=i to t−1, by setting $d=d_{u-1}g$ and $d_0=d \cdot c_0$, and determining $d_j$, for j=u−1 down to 1, as $d_j = d_{j-1} \oplus d \cdot c_j \mod B$.

If the randomizer component determines that the raw random data store is in a zero state, the randomizer component may reset the raw random data store by extracting raw random data from the extraction. To do so, the randomizer component may set $d_j=k_j$ for $0 \leq j < \min(u, v)$, may shift the plurality of registers to step the Galois register as described above, may update the extraction state, and may determine the Shannon level of the raw random data store as $s=\min(u, v)n$.

To update the extraction state, the randomizer component may set the quantity of distinct values $k_i$ of the extraction state, t, to t=1, and may set $k_0=e_0$. For j=1 to v−1, and if the randomizer component determines that the jth cryptographic random data output is not in the current extraction state (e.g., if $e_j \notin \{k_i\}_{i=0}^{t-1}$), the randomizer component may determine that $k_t=e_j$ and t=t+1. The randomizer component may expand the current extraction state and, while t<v, may shift the plurality of registers in the raw random data store to step the Galois register to concentrate the raw random data as described above, may determine the inner QRT of the extraction state as described above, and may expand the current extraction state.

The randomizer component may expand the extraction state to determine the elements of $\mathbb{F}_{2^n}$ that are not equal to any elements in $\{d_j\}_{j=0}^{t-1}$ by evaluating the current transformed extraction state. To do so, the randomizer component may set j=0 and, while j<t and t<v, may grow the extraction state up to the maximal v values by performing an inner QRT and outer QRT on the extraction state as described above (e.g., may determine $e=D(k_j) \mod b$) and, if the randomizer component determines that the jth cryptographic random data output is not in the current extraction state (e.g., if $e \notin \{k_i\}_{i=0}^{t-1}$), the randomizer component may determine that $k_t=e$ and t=t+1.

Figure 1D:
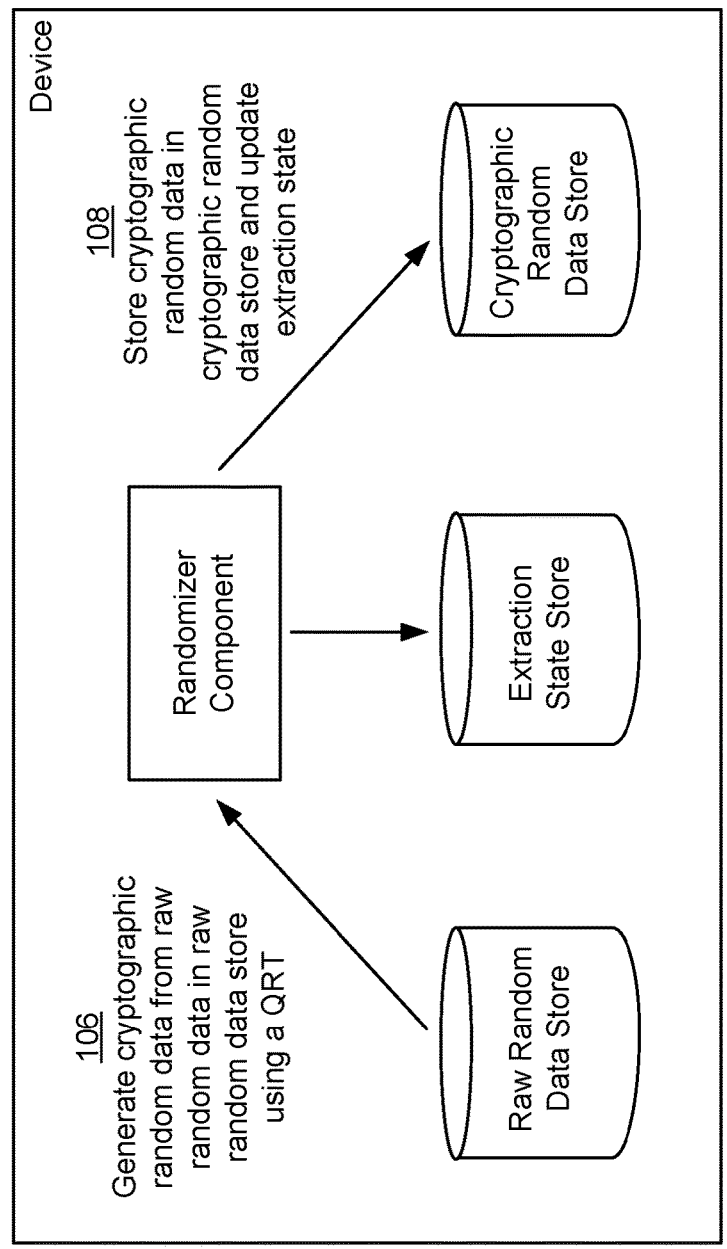

As shown in FIG. 1D, and by reference number 106, the randomizer component may generate cryptographic random data from the raw random data stored in the raw random data store. In some implementations, the randomizer component may generate the cryptographic random data using a QRT, in which case, the randomizer component may transform or convert the data strings (e.g., words) of the raw random data into data strings (e.g., words) of cryptographic random data based on the extraction state of the raw random data store and the Da Yan or Chinese remainder theorem.

In some implementations, the randomizer component may generate cryptographic random data based on receiving a request for cryptographic random data. For example, a process or an application on the device may request cryptographic random data so that the process or application can use the cryptographic random data to perform one or more cryptographic and/or network security processes, such as generating a cryptographic key, encrypting data that is to be transmitted to another device over a network, decrypting data received from another device, and/or the like.

To generate cryptographic random data, the randomizer component may determine whether the Shannon level of the raw random data store satisfies the Shannon level threshold (e.g., $s < s_m$). If the Shannon level does not satisfy the Shannon level threshold, the randomizer component may add raw random data to the raw random data store, as described above, until the Shannon level satisfies the Shannon level threshold. Moreover, if the randomizer component determines that the quantity of times that cryptographic random data is generated from the raw random data stored in the raw random data store since the last update of the Shannon level, w, is zero, the randomizer component may update the extraction state associated with the raw random data store such that the extraction state is initialized and/or reset with raw random data.

The randomizer component may generate $\{e_j\}_{j=0}^{v-1}$ n-bit long data strings (e.g., words) of cryptographic random data by shifting the plurality of registers of the raw random data store to step the Galois register and performing a QRT on the raw random data in the raw random data store to mix, concentrate, and extend the raw random data. To perform the QRT on the raw random data, the randomizer component may determine the transformed $\{d_j\}_{j=0}^{u-1}$ data strings (e.g., words) of the raw random data, $\{\bar{d}_i\}_{i=0}^{u-1}$, based on an inward QRT, and may generate the $\{e_j\}_{j=0}^{v-1}$ data strings (e.g., words) of the cryptographic random data from the transformed data strings (e.g., words) based on an outward QRT.

The inward QRT may transform or convert the raw random data into a form which may be evaluated to generate the cryptographic random data. To perform the inward QRT, the randomizer component may set $\bar{d}_i=d_i$ for $0 \leq i < u$, may perform, for i=0 to (u−2), $\bar{d}_j = \bar{d}_j \oplus \bar{d}_i$ for j=i+1 to (u−1) where $\bar{d}_j = \bar{d}_j \cdot q_i^{-1} \mod q_j$, and may determine $\{\bar{d}_i\}_{i=0}^{u-1}$ based on $\bar{d}_j$.

The outward QRT may convert the transformed values of $\{\bar{d}_i\}_{i=0}^{u-1}$ data strings (e.g., words) to a reduced (e.g., evaluated) output $\{e_j\}_{j=0}^{u-1}$. For j=0 to (u−1), the randomizer component may determine $e_j$ using a single QRT extraction. In some implementations, the randomizer component may perform the single QRT extraction by setting $e=\bar{d}_{u-1} \mod p(x)$ and, for i=u−2 down to 0, determining $e=(\bar{d}_i+q_i e \mod p(x))$. In some implementations, the randomizer component may perform the single QRT extraction by generating a polynomial view of $\bar{d}_{u-1}$ $$\bar{d}_{u-1}(x) = \sum_{j=0}^{r-1} d_{u-1}^{(j)} x^j$$

setting $e=\bar{d}_{u-1}(k)$ and, for $i=u-2$ down to 0, determining $temp=q_i(k) \bmod b$, $e=temp \cdot e \bmod b$, $temp=\bar{d}_i(k) \bmod m$, and $e=e \oplus temp$.

After generating the cryptographic random data, the randomizer component may determine an updated Shannon level of the raw random data store to ensure that an adequate amount of entropy is present in the raw random data for subsequent processes of generating cryptographic random data. To update the Shannon level, the randomizer component may determine whether the quantity of times that cryptographic random data has been generated from the raw random data since the last update of the Shannon level satisfies the threshold quantity (e.g., $w \geq w_m$). If the quantity of times that cryptographic random data has been generated from the raw random data since the last update of the Shannon level satisfies the threshold quantity, the randomizer component may update the Shannon level by reducing the quantity of Shannons in the raw random data by 1 (e.g., $s=s-1$) and setting the quantity of times that cryptographic random data has been generated from the raw random data since the last update of the Shannon level to zero (e.g., $w=0$, which may trigger the randomizer component to update the extraction state).

If the randomizer component determines, after updating the Shannon level, that the Shannon level does not satisfy the Shannon level threshold (e.g., $s<s_m$, (s mod r)=0, and/or the like), the randomizer component may add raw random data to the raw random data store. In this case, the randomizer component may add raw random data from the extraction state store to the raw random data store. To do so, the randomizer component may intermix and concentrate the raw random data in the raw random data store with the raw random data being added from the extraction state store by determining $d_{u-1}=d_{u-1} \oplus e_i$ for $i=0$ to $v-1$ and single stepping the Galois register.

After intermixing and concentrating the raw random data in the raw random data store with the raw random data being added from the extraction state store, the randomizer component may determine whether the intermixing and concentrating resulted in a zero state of the raw random data store (e.g., if $\{d_i\}_{i=0}^{u-1}=\{0\}$. If the randomizer component determines that the raw random data store is in a zero state, the randomizer component may reset the raw random data store as described above. If the randomizer component determines that the raw random data store is in a non-zero state, the randomizer component may update the extraction state associated with the raw random data store.

To update the extraction state, the randomizer component may set the quantity of distinct values $k_i$ of the extraction state, t, to $t=1$, and may set $k_0=e_0$. For $j=1$ to $v-1$, and if the randomizer component determines that the jth cryptographic random data output is not in the current extraction state (e.g., if $e_j \notin \{k_i\}_{i=0}^{t-1}$), the randomizer component may determine that $k_t=e_j$ and $t=t+1$. The randomizer component may expand the current extraction state and, while $t<v$, may shift the plurality of registers in the raw random data store to step the Galois register to concentrate the raw random data as described above, may determine the inner QRT of the extraction state as described above, and may expand the current extraction state.

The randomizer component may expand the extraction state to determine the elements of $\mathbb{F}_{2^n}$ that are not equal to any elements in $\{d_j\}_{j=0}^{t-1}$ by evaluating the current transformed extraction state. To do so, the randomizer component may set $j=0$ and, while $j<t$ and $t<v$, may grow the extraction state up to the maximal v values by performing an inner QRT and outer QRT on the extraction state as described above (e.g., may determine $e=D(k_j)$ mod b) and, if the randomizer component determines that the jth cryptographic random data output is not in the current extraction state (e.g., if $e \notin \{k_i\}_{i=0}^{t-1}$), the randomizer component may determine that $k_t=e$ and $t=t+1$.

As further shown in FIG. 1D, and by reference number 108, the randomizer component may store the generated cryptographic random data in the cryptographic random data store and may update the extraction state based on generating the cryptographic random data. As indicated above, the cryptographic random data store may include a plurality of registers. In this case, the randomizer component may store respective data strings (e.g., words) of the cryptographic random data in respective registers of the plurality of registers included in the cryptographic random data store.

Figure 1E:
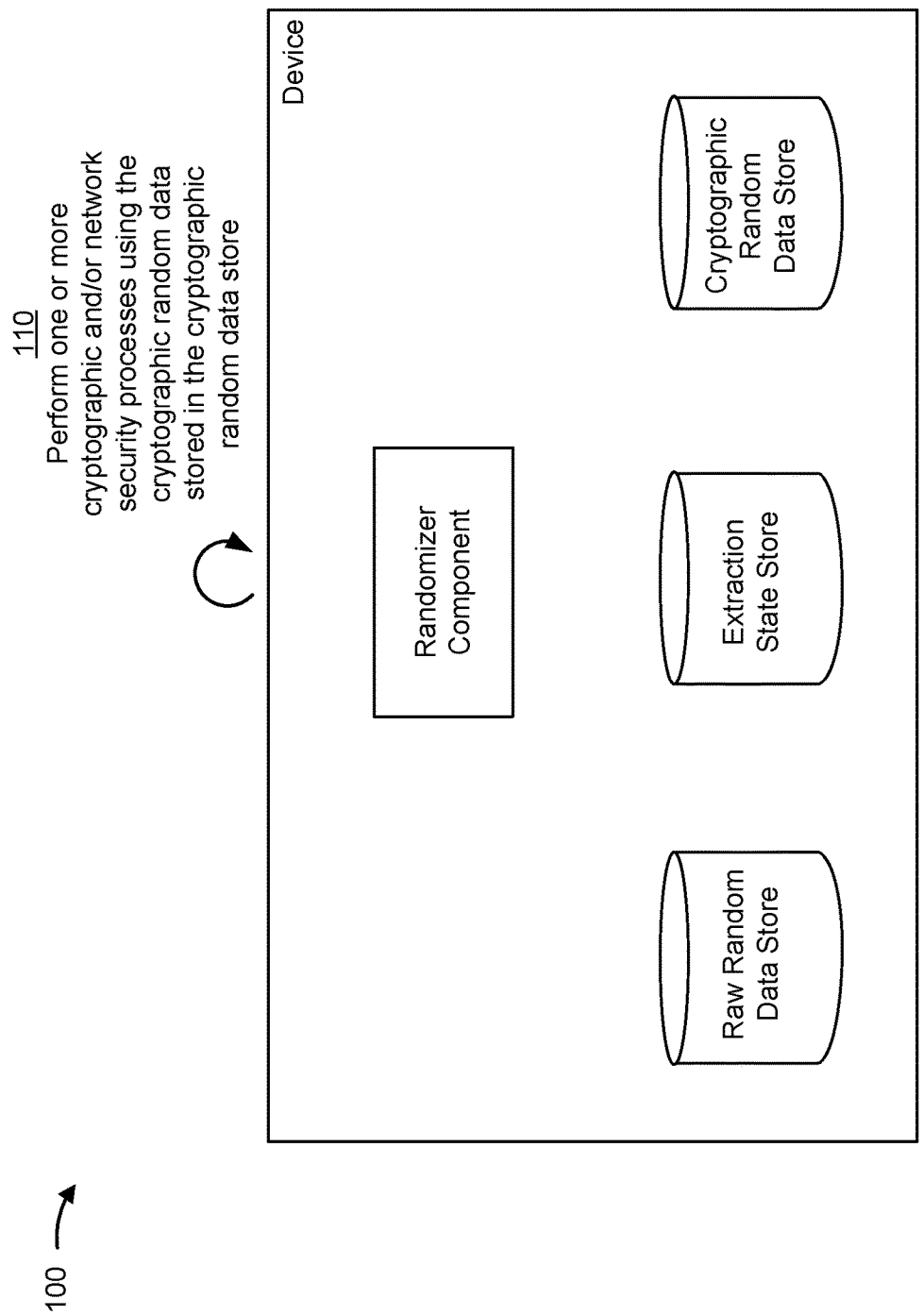

As shown in FIG. 1E, and by reference number 110, the device may perform one or more cryptographic and/or network security processes using the cryptographic random data stored in the cryptographic random data store. For example, the device may use the cryptographic random data to generate cryptographic keys. As another example, the device may use the cryptographic random data to encrypt plaintext data. As another example, the device may use the cryptographic random data to decrypt cyphertext data.

In this way, the device may be capable of generating cryptographic random data in a manner that maintains an adequate flow of entropy in and out of the raw random data store. To do so, the device may use Galois stepping of raw random data stored in the raw random data store to mix, concentrate, and extend the raw random data, and may use a QRT to generate cryptographic random data from the raw random data. In this way, the device may generate cryptographic random data in a manner that is mathematically provable and thus more secure than block ciphers and hashing functions. Thus, the security of processes and applications of the device, which may use the cryptographic random data generated by the device, is also enhanced. In this way, the device may more securely perform one or more cryptographic and/or network security processes, such as generating cryptographic keys, encrypting plaintext data, decrypting cyphertext data, and/or the like.

As indicated above, FIGS. 1A-1E are provided merely as one or more examples. Other examples may differ from what is described with regard to FIGS. 1A-1E.

Figure 2:
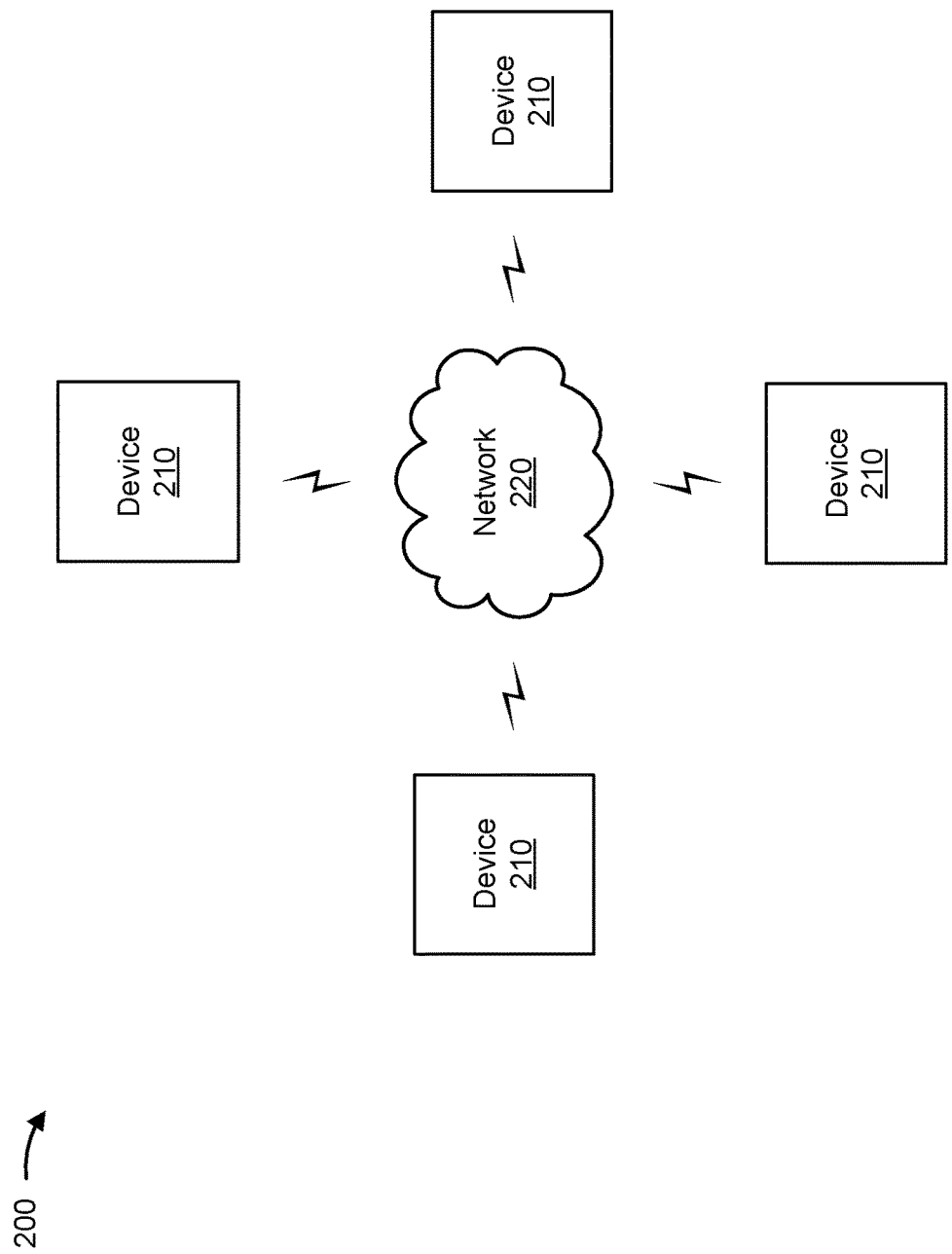
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more devices 210 (collectively referred to as "devices 210" and individually as device 210) communicatively connected via a network 220. Devices of environment 200 may interconnect via wired connections, wireless connections, or a combination of wired and wireless connections.

Device 210 includes one or more devices capable of receiving, generating, storing, processing, and/or providing data associated with generating cryptographic random data from raw random data, as described herein. In some implementations, device 210 may include a user device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, device 210 may include a stand-alone server, a rack-mountable server, a blade server, a data center, a virtualized server, a plurality of servers, and/or the like. In some implementations, device 210 may include a network device, such as a firewall, a router, a gateway, a switch, a bridge, a wireless access point, a base station (e.g., eNodeB, NodeB, gNodeB, and/or the like), and/or the like. In some implementations, device 210 may be implemented as a physical device implemented within a housing, such as a chassis. In some implementations, device 210 may be implemented as a virtual device implemented by one or more computer devices of a cloud computing environment or a data center.

In some implementations, device 210 may store raw random data in a raw random data store. The raw random data may include a first plurality of data strings (e.g., words). Device 210 may generate, using a QRT, cryptographic random data based on the raw random data. The cryptographic random data includes a second plurality of data strings (e.g., words) that is transformed from the first plurality of data strings based on an extraction state stored in an extraction state store. Device 210 may store the cryptographic random data in a cryptographic random data store and may use the cryptographic random data to perform one or more cryptographic and/or network security processes, such as generating cryptographic keys, encrypting plaintext data, decrypting cyphertext data, and/or the like.

Network 220 includes one or more wired and/or wireless networks. For example, network 220 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
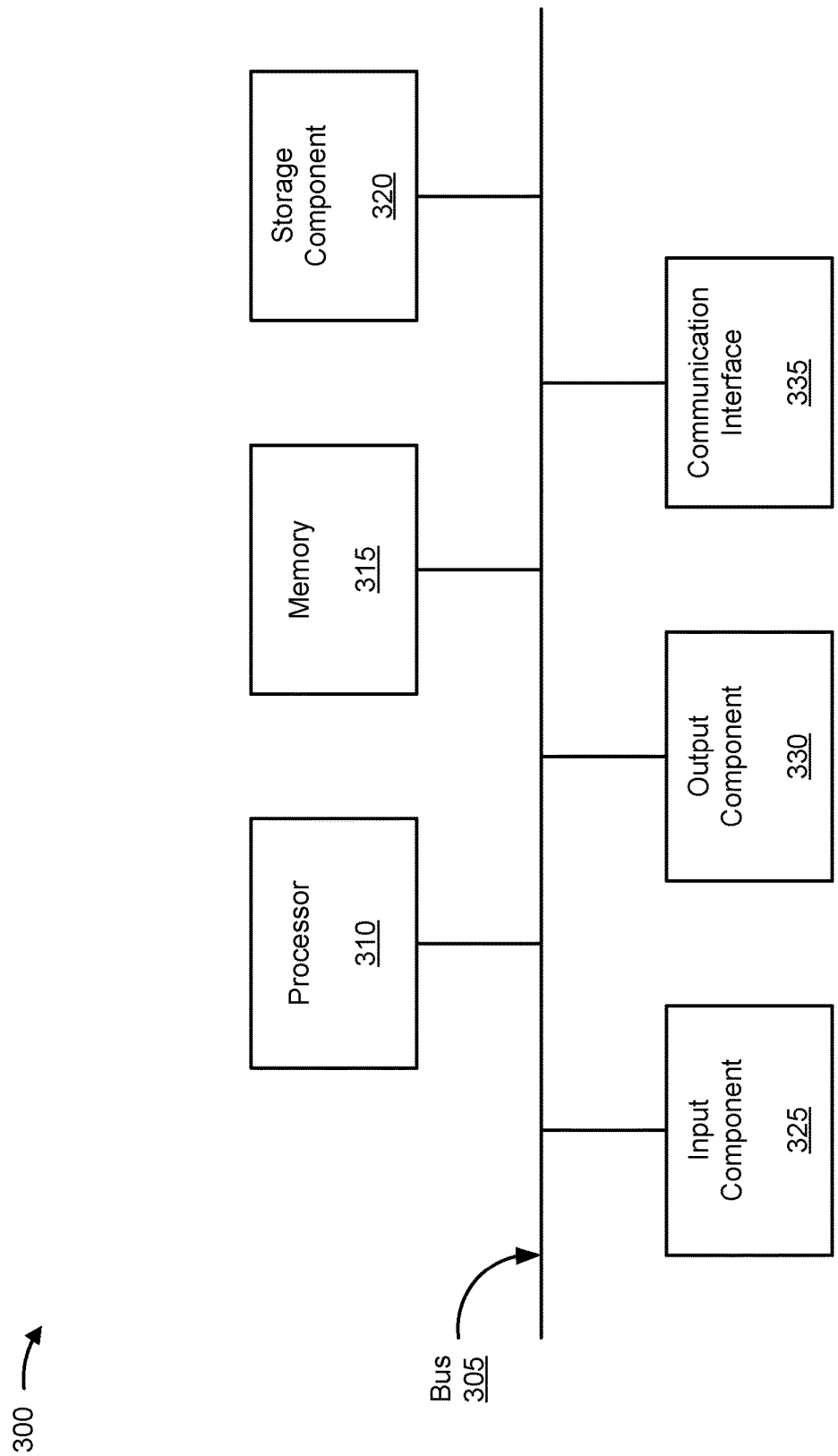
FIGS. 3A and 3B are diagrams of example components of one or more devices of FIG. 2.
Figure 3B:
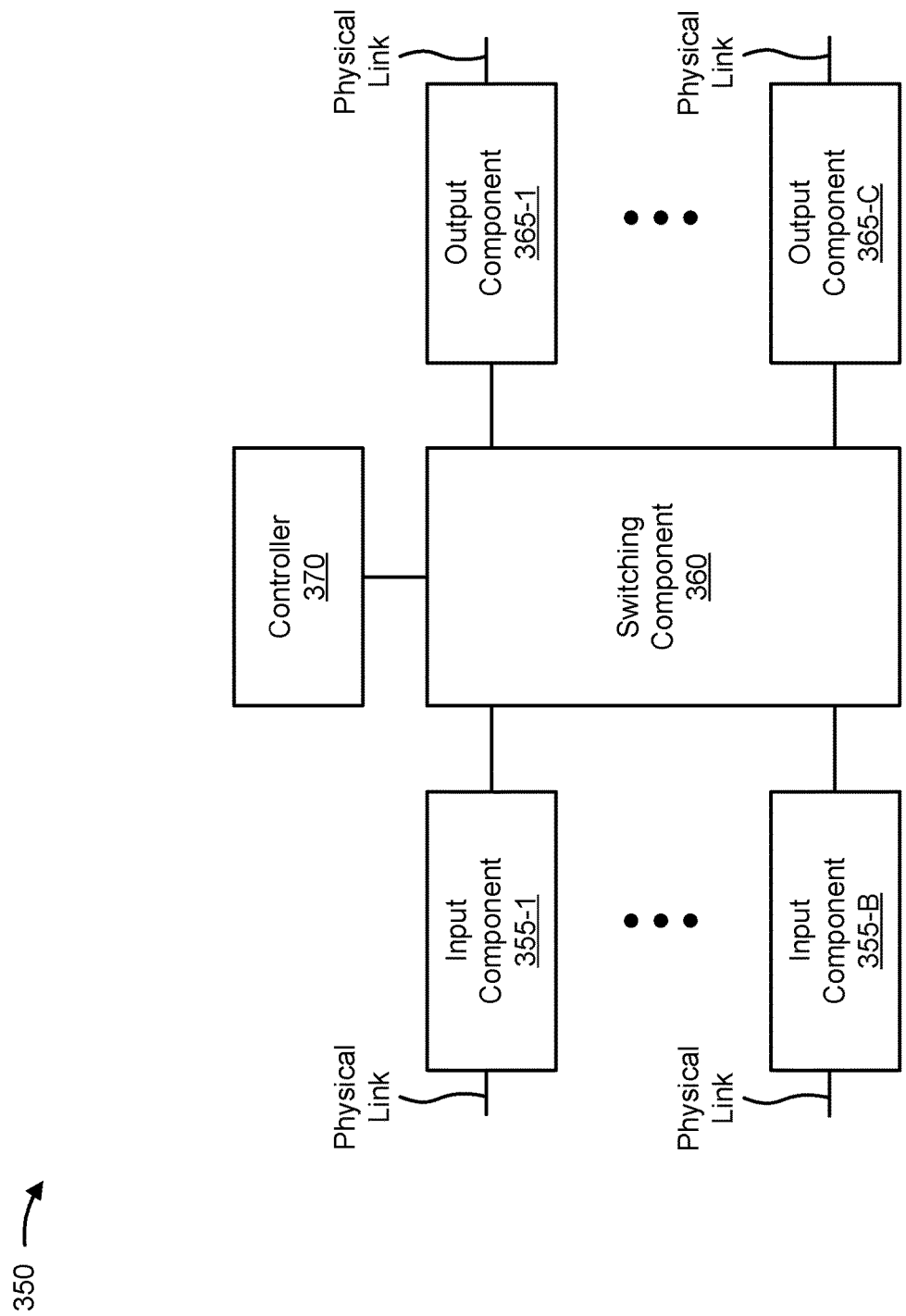

FIGS. 3A and 3B are diagrams of example components of one or more devices of FIG. 2. FIG. 3A is a diagram of example components of a device 300. In some implementations, device 300 may correspond to device 210. In some implementations, device 210 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. In some implementations, device 350 may correspond to device 210. In some implementations, device 210 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input component 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
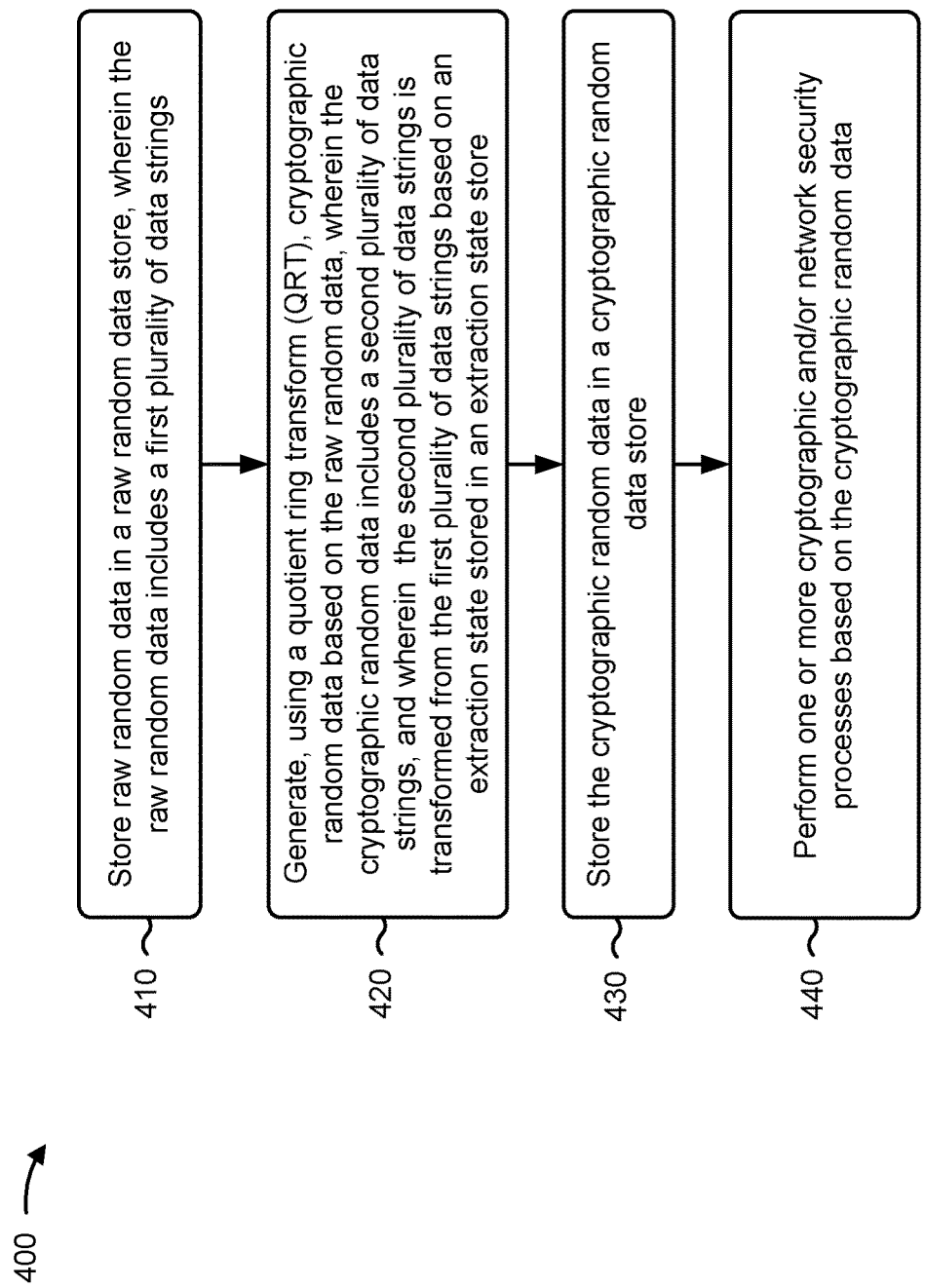
FIGS. 4-6 are flow charts of example processes for generating cryptographic random data from raw random data.

FIG. 4 is a flow chart of an example process 400 for generating cryptographic random data from raw random data. In some implementations, one or more process blocks of FIG. 4 may be performed by device (e.g., device 210, device 300, device 350, and/or the like). In some implementations, one or more process blocks of FIG. 4 may be performed by another device or a group of devices separate from or including the device.

As shown in FIG. 4, process 400 may include storing raw random data in a raw random data store, wherein the raw random data includes a first plurality of data strings (block 410). For example, the device (e.g., using processor 310, memory 315, storage component 320, input component 325, output component 330, communication interface 335, input component 355, switching component 360, output component 365, controller 370, and/or the like) may store raw random data in a raw random data store, as described above. In some implementations, the raw random data includes a first plurality of data strings.

As further shown in FIG. 4, process 400 may include generating, using a QRT, cryptographic random data based on the raw random data, wherein the cryptographic random data includes a second plurality of data strings, and wherein the second plurality of data strings is transformed from the first plurality of data strings based on an extraction state stored in an extraction state store (block 420). For example, the device (e.g., using processor 310, memory 315, storage component 320, input component 325, output component 330, communication interface 335, input component 355, switching component 360, output component 365, controller 370, and/or the like) may generate, using a QRT, cryptographic random data based on the raw random data, as described above. In some implementations, the cryptographic random data includes a second plurality of data strings. In some implementations, the second plurality of data strings is transformed from the first plurality of data strings based on an extraction state stored in an extraction state store.

As further shown in FIG. 4, process 400 may include storing the cryptographic random data in a cryptographic random data store (block 430). For example, the device (e.g., using processor 310, memory 315, storage component 320, input component 325, output component 330, communication interface 335, input component 355, switching component 360, output component 365, controller 370, and/or the like) may store the cryptographic random data in a cryptographic random data store, as described above.

As further shown in FIG. 4, process 400 may include performing one or more cryptographic and/or network security processes based on the cryptographic random data (block 440). For example, the device (e.g., using processor 310, memory 315, storage component 320, input component 325, output component 330, communication interface 335, input component 355, switching component 360, output component 365, controller 370, and/or the like) may perform one or more cryptographic and/or network security processes based on the cryptographic random data, as described above.

Process 400 may include additional implementations, such as any single implementation or any combination of implementations described below and/or in connection with one or more other processes described elsewhere herein.

In some implementations, the raw random data store includes a plurality of registers, each register, of the plurality of registers, stores a respective data string of the first plurality of data strings, and the plurality of registers comprises a Galois register. In some implementations, storing the raw random data in the raw random data store comprises intermixing and concentrating a first subset of the raw random data with a second subset of the raw random data; and shifting the plurality of registers to step the Galois register. In some implementations, process 400 further comprises shifting, based on storing the cryptographic random data, the plurality of registers to step the Galois register. In some implementations, shifting the plurality of registers comprises determining a step value based on the extraction state; and shifting the plurality of registers based on the step value. In some implementations, the step value may be based on a quantity of the plurality of registers.

In some implementations, process 400 further comprises determining, after generating the cryptographic random data, whether a quantity of times that cryptographic random data has been generated since a Shannon level of the raw random data store was last updated satisfies a threshold quantity, and updating the Shannon level based on determining that the quantity of times that cryptographic random data has been generated since the Shannon level of the raw random data store was last updated satisfies the threshold quantity. In some implementations, process 400 further comprises determining whether a modulo operation of the Shannon level, after updating the Shannon level, results in a zero value and, based on determining that the modulo operation of the Shannon level results in the zero value, storing additional raw random data, from the extraction state store, in the raw random data store and updating the extraction state.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
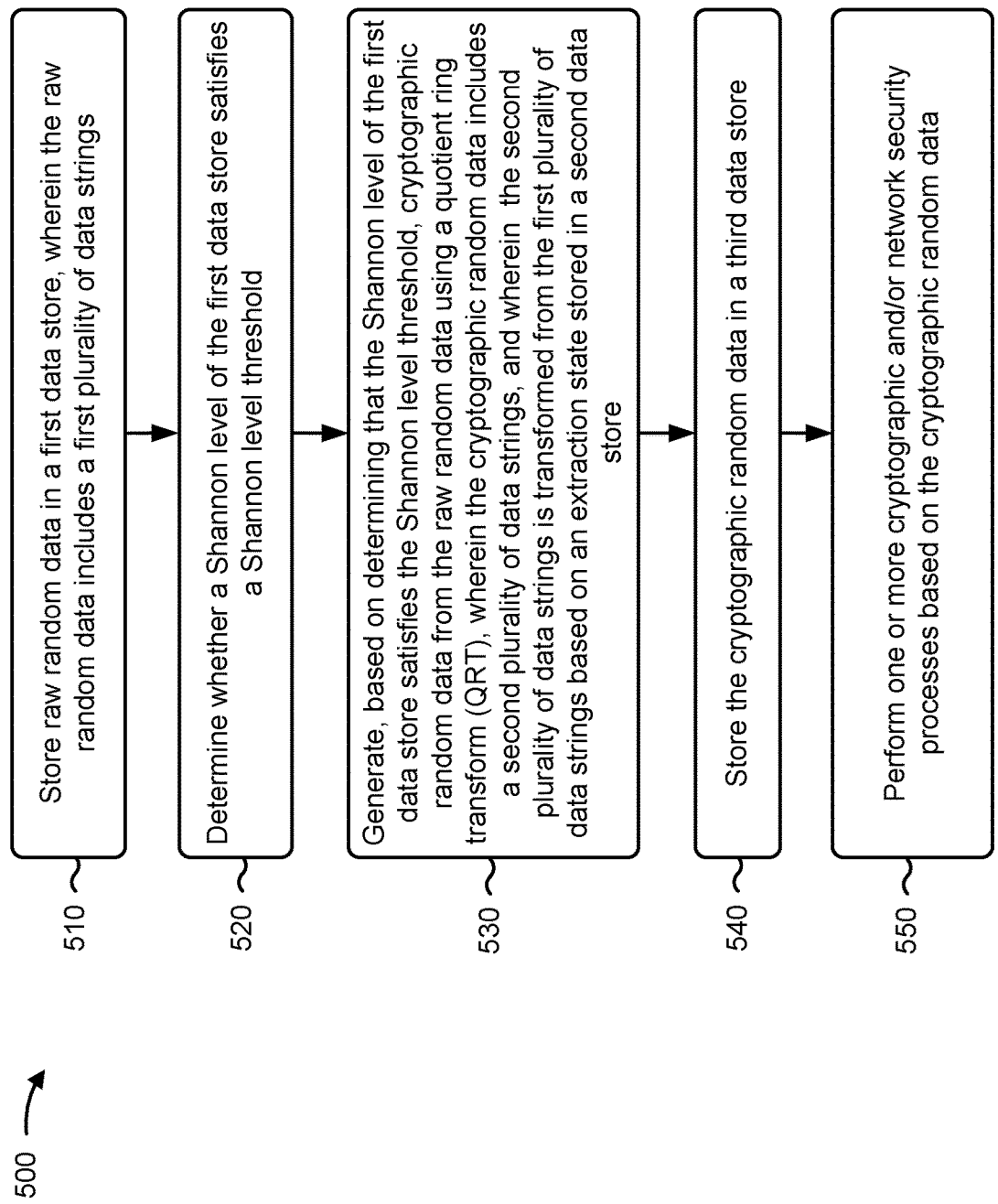

FIG. 5 is a flow chart of an example process 500 for generating cryptographic random data from raw random data. In some implementations, one or more process blocks of FIG. 5 may be performed by device (e.g., device 210, device 300, device 350, and/or the like). In some implementations, one or more process blocks of FIG. 5 may be performed by another device or a group of devices separate from or including the device.

As shown in FIG. 5, process 500 may include storing raw random data in a first data store, wherein the raw random data includes a first plurality of data strings (block 510). For example, the device (e.g., using processor 310, memory 315, storage component 320, input component 325, output component 330, communication interface 335, input component 355, switching component 360, output component 365, controller 370, and/or the like) may store raw random data in a first data store, as described above. In some implementations, the raw random data includes a first plurality of data strings.

As further shown in FIG. 5, process 500 may include determining whether a Shannon level of the first data store satisfies a Shannon level threshold (block 520). For example, the device (e.g., using processor 310, memory 315, storage component 320, input component 325, output component 330, communication interface 335, input component 355, switching component 360, output component 365, controller 370, and/or the like) may determine whether a Shannon level of the first data store satisfies a Shannon level threshold, as described above.

As further shown in FIG. 5, process 500 may include generating, based on determining that the Shannon level of the first data store satisfies the Shannon level threshold, cryptographic random data from the raw random data using a QRT, wherein the cryptographic random data includes a second plurality of data strings, and wherein the second plurality of data strings is transformed from the first plurality of data strings based on an extraction state stored in a second data store (block 530). For example, the device (e.g., using processor 310, memory 315, storage component 320, input component 325, output component 330, communication interface 335, input component 355, switching component 360, output component 365, controller 370, and/or the like) may generate, based on determining that the Shannon level of the first data store satisfies the Shannon level threshold, cryptographic random data from the raw random data using a QRT, as described above. In some implementations, the cryptographic random data includes a second plurality of data strings. In some implementations, the second plurality of data strings is transformed from the first plurality of data strings based on an extraction state stored in a second data store.

As further shown in FIG. 5, process 500 may include storing the cryptographic random data in a third data store (block 540). For example, the device (e.g., using processor 310, memory 315, storage component 320, input component 325, output component 330, communication interface 335, input component 355, switching component 360, output component 365, controller 370, and/or the like) may store the cryptographic random data in a third data store, as described above.

As further shown in FIG. 5, process 500 may include performing one or more cryptographic and/or network security processes based on the cryptographic random data (block 550). For example, the device (e.g., using processor 310, memory 315, storage component 320, input component 325, output component 330, communication interface 335, input component 355, switching component 360, output component 365, controller 370, and/or the like) may perform one or more cryptographic and/or network security processes based on the cryptographic random data, as described above.

Process 500 may include additional implementations, such as any single implementation or any combination of implementations described below and/or in connection with one or more other processes described elsewhere herein.

In some implementations, storing the raw random data in the first data store comprises intermixing and concentrating a first subset of the raw random data with a second subset of the raw random data, determining the Shannon level of the first data store, and storing information identified the Shannon level. In some implementations, process 500 further comprises determining a quantity of times that cryptographic random data has been generated since the Shannon level of the first data store has been updated and updating the extraction state based on determining that the quantity of times that cryptographic random data has been generated since the Shannon level of the first data store was last updated is zero, and generating the cryptographic random data from the raw random data using the QRT comprises generating the cryptographic random data based on updating the extraction state. In some implementations, process 500 further comprises updating, based on generating the cryptographic random data, the quantity of times that cryptographic random data has been generated since the Shannon level of the first data store was last updated.

In some implementations, process 500 further comprises intermixing and concentrating, after generating the cryptographic random data, other raw random data from the second data store with the raw random data stored in the first data store; and determine an updated extraction state based on intermixing and concentrating the other raw random data with the raw random data. In some implementations, process 500 further comprises determining that the first data store is in a static state, intermixing and concentrating, based on determining that the first data store is in the static state, other raw random data from the second data store with the raw random data stored in the first data store, determining an updated extraction state based on intermixing and concentrating the other raw random data with the raw random data, and updating the Shannon level of the first data store. In some implementations, process 500 further comprises updating the Shannon level of the first data store based on generating the cryptographic random data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
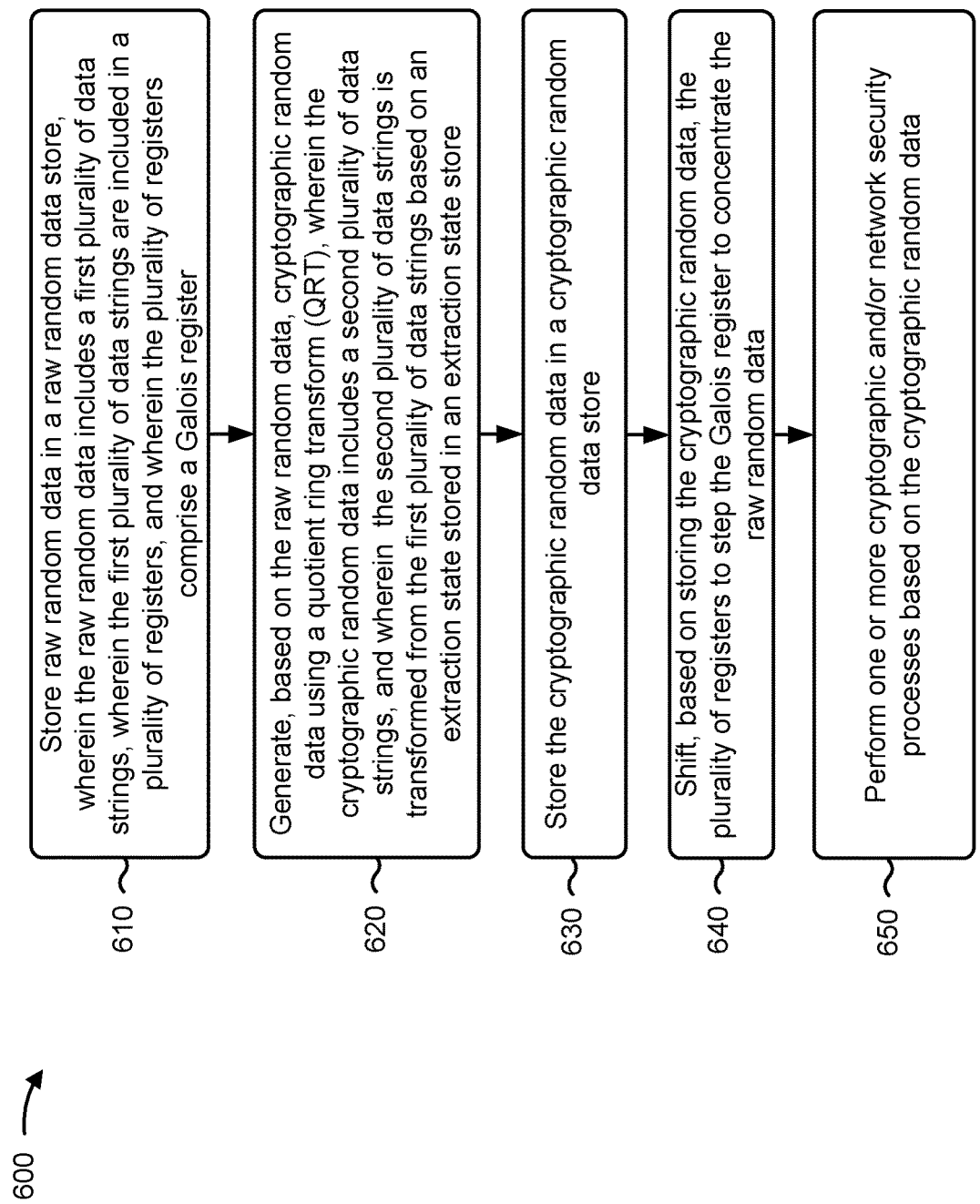

FIG. 6 is a flow chart of an example process 600 for generating cryptographic random data from raw random data. In some implementations, one or more process blocks of FIG. 6 may be performed by device (e.g., device 210, device 300, device 350, and/or the like). In some implementations, one or more process blocks of FIG. 6 may be performed by another device or a group of devices separate from or including the device.

As shown in FIG. 6, process 600 may include storing raw random data in a raw random data store, wherein the raw random data includes a first plurality of data strings, wherein the first plurality of data strings are included in a plurality of registers, and wherein the plurality of registers comprise a Galois register (block 610). For example, the device (e.g., using processor 310, memory 315, storage component 320, input component 325, output component 330, communication interface 335, input component 355, switching component 360, output component 365, controller 370, and/or the like) may store raw random data in a raw random data store, as described above. In some implementations, the raw random data includes a first plurality of data strings. In some implementations, the first plurality of data strings are included in a plurality of registers. In some implementations, the plurality of registers comprise a Galois register.

As further shown in FIG. 6, process 600 may include generating, based on the raw random data, cryptographic random data using a QRT, wherein the cryptographic random data includes a second plurality of data strings, and wherein the second plurality of data strings is transformed from the first plurality of data strings based on an extraction state stored in an extraction state store (block 620). For example, the device (e.g., using processor 310, memory 315, storage component 320, input component 325, output component 330, communication interface 335, input component 355, switching component 360, output component 365, controller 370, and/or the like) may generate, based on the raw random data, cryptographic random data using a QRT, as described above. In some implementations, the cryptographic random data includes a second plurality of data strings. In some implementations, the second plurality of data strings is transformed from the first plurality of data strings based on an extraction state stored in an extraction state store.

As further shown in FIG. 6, process 600 may include storing the cryptographic random data in a cryptographic random data store (block 630). For example, the device (e.g., using processor 310, memory 315, storage component 320, input component 325, output component 330, communication interface 335, input component 355, switching component 360, output component 365, controller 370, and/or the like) may store the cryptographic random data in a cryptographic random data store, as described above.

As further shown in FIG. 6, process 600 may include shifting, based on storing the cryptographic random data, the plurality of registers to step the Galois register to concentrate the raw random data (block 640). For example, the device (e.g., using processor 310, memory 315, storage component 320, input component 325, output component 330, communication interface 335, input component 355, switching component 360, output component 365, controller 370, and/or the like) may shift, based on storing the cryptographic random data, the plurality of registers to step the Galois register to concentrate the raw random data, as described above.

As further shown in FIG. 6, process 600 may include performing one or more cryptographic and/or network security processes based on the cryptographic random data (block 650). For example, the device (e.g., using processor 310, memory 315, storage component 320, input component 325, output component 330, communication interface 335, input component 355, switching component 360, output component 365, controller 370, and/or the like) may perform one or more cryptographic and/or network security processes based on the cryptographic random data, as described above.

Process 600 may include additional implementations, such as any single implementation or any combination of implementations described below and/or in connection with one or more other processes described elsewhere herein.

In some implementations, shifting the plurality of registers to step the Galois register comprises determining a step value based on the extraction state and shifting the plurality of registers based on the step value. In some implementations, the step value may be based on a quantity of the plurality of registers. In some implementations, process 600 further comprises updating, based on generating the cryptographic random data a quantity of times that cryptographic random data has been generated since a Shannon level of the raw random data store was last updated and the Shannon level of the raw random data store. In some implementations, process 600 further comprises initializing the raw random data store, and storing the raw random data in the raw random data store comprises storing the raw random data in the raw random data store based on initializing the raw random data store.

In some implementations, initializing the raw random data store comprises initializing the extraction state, setting a Shannon level of the raw random data store to zero, and setting a quantity of times that cryptographic random data has been generated since a Shannon level of the raw random data store was last updated to zero. In some implementations, storing the raw random data in the raw random data store comprises intermixing and concentrating a first subset of the raw random data with a second subset of the raw random data and shifting the plurality of registers to step the Galois register.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   storing, by a device, raw random data in a first data store;
   generating, by the device and based on the raw random data, first cryptographic random data,
      wherein the first cryptographic random data is transformed from the raw random data based on an extraction state associated with the first data store;
   storing, by the device, the first cryptographic random data in a second data store;
   determining, by the device, a quantity of times that the first cryptographic random data has been generated since an amount of entropy of the first data store has been updated;
   updating, by the device and based on determining that the quantity of times that the first cryptographic random data has been generated since the amount of entropy of the first data store was last updated is zero, the extraction state;
   generating, by the device, based on updating the extraction state, and based on determining that the amount of entropy of the first data store satisfies a threshold, second cryptographic random data; and
   performing, based on the second cryptographic random data, at least one of:
      a cryptographic process, or
      a network security process.

2. The method of claim 1, wherein the amount of entropy of the first data store is based on a Shannon level of the raw random data.

3. The method of claim 1, further comprising:
   storing, by the device, the first cryptographic random data in a second data store;
   intermixing and concentrating, after generating the first cryptographic random data, another raw random data from the second data store with the raw random data stored in the first data store; and
   determining another updated extraction state based on intermixing and concentrating the other raw random data with the raw random data.

4. The method of claim 1, wherein the first data store comprises a register; and
the method further comprising:
intermixing and concentrating, based on the register, a first subset of the raw random data with a second subset of the raw random data.

5. The method of claim 1, further comprising:
shifting, based on storing the first cryptographic random data, a plurality of registers included in the first data store to step a register, included in the first data store, to concentrate the raw random data.

6. The method of claim 1, further comprising:
determining a step value based on the extraction state; and
shifting, based on storing the first cryptographic random data and based on the step value, a plurality of registers included in the first data store to step a Galois register to concentrate the raw random data.

7. The method of claim 1, further comprising:
updating, based on determining that the quantity of times that the first cryptographic random data has been generated since the amount of entropy of the first data store was last updated satisfies a threshold quantity, the amount of entropy of the first data store.

8. A device, comprising:
one or more memories; and
one or more processors to:
store raw random data in a first data store;
generate, based on the raw random data, first cryptographic random data, wherein the first cryptographic random data is transformed from the raw random data based on an extraction state associated with the first data store;
determine a quantity of times that the first cryptographic random data has been generated since an amount of entropy of the first data store has been updated;
update, based on determining that the quantity of times that the first cryptographic random data has been generated since the amount of entropy of the first data store was last updated is zero, the extraction state;
generate based on updating the extraction state, and based on determining that the amount of entropy of the first data store satisfies a threshold, second cryptographic random data; and
perform, based on the second cryptographic random data, at least one of:
a cryptographic process, or
a network security process.

9. The device of claim 8, wherein the amount of entropy of the first data store is based on a Shannon level of the raw random data.

10. The device of claim 8, wherein the one or more processors are further to:
store the first cryptographic random data in a second data store;
intermix and concentrate, after generating the first cryptographic random data, another raw random data from the second data store with the raw random data stored in the first data store; and
determine another updated extraction state based on intermixing and concentrating the other raw random data with the raw random data.

11. The device of claim 8, wherein the first data store comprises a register, and
wherein the one or more processors are further to:
intermix and concentrate, based on the register, a first subset of the raw random data with a second subset of the raw random data.

12. The device of claim 8, wherein the one or more processors are further to:
shift, based on storing the first cryptographic random data, a plurality of registers included in the first data store to step a register, included in the first data store, to concentrate the raw random data.

13. The device of claim 8, wherein the one or more processors are further to:
determine a step value based on the extraction state; and
shift, based on storing the first cryptographic random data and based on the step value, a plurality of registers included in the first data store to step a Galois register to concentrate the raw random data.

14. The device of claim 8, wherein the one or more processors are further to:
update, based on determining that the quantity of times that the first cryptographic random data has been generated since the amount of entropy of the first data store was last updated satisfies a threshold quantity, the amount of entropy of the first data store.

15. A non-transitory computer-readable medium storing a set of instructions, the set of instructions comprising:
one or more instructions that, when executed by one or more processors of a device, cause the device to:
store raw random data in a first data store;
generate, based on the raw random data, first cryptographic random data,
wherein the first cryptographic random data is transformed from the raw random data based on an extraction state associated with the first data store;
determine a quantity of times that the first cryptographic random data has been generated since an amount of entropy of the first data store has been updated;
update, based on determining that the quantity of times that the first cryptographic random data has been generated since the amount of entropy of the first data store was last updated is zero, the extraction state;
generate based on updating the extraction state, and based on determining that the amount of entropy of the first data store satisfies a threshold, second cryptographic random data; and
perform, based on the second cryptographic random data, at least one of:
a cryptographic process, or
a network security process.

16. The non-transitory computer-readable medium of claim 15, wherein the amount of entropy of the first data store is based on a Shannon level of the raw random data.

17. The non-transitory computer-readable medium of claim 15, wherein the one or more instructions further cause the device to:
store the first cryptographic random data in a second data store;
intermix and concentrate, after generating the first cryptographic random data, another raw random data from the second data store with the raw random data stored in the first data store; and determine another updated extraction state based on intermixing and concentrating the other raw random data with the raw random data.

18. The non-transitory computer-readable medium of claim 15, wherein the first data store comprises a register, and wherein the one or more instructions further cause the device to:
intermix and concentrate, based on the register, a first subset of the raw random data with a second subset of the raw random data.

19. The non-transitory computer-readable medium of claim 15, wherein the one or more instructions further cause the device to:
shift, based on storing the first cryptographic random data, a plurality of registers included in the first data store to step a register, included in the first data store, to concentrate the raw random data.

20. The non-transitory computer-readable medium of claim 15, wherein the one or more instructions further cause the device to:
determine a step value based on the extraction state; and
shift, based on storing the first cryptographic random data and based on the step value, a plurality of registers included in the first data store to step a Galois register to concentrate the raw random data.

* * * * *